US011035347B2

(12) United States Patent
Schriever-Schubring (10) Patent No.: US 11,035,347 B2
(45) Date of Patent: Jun. 15, 2021

(54) WIND TURBINE AND USE OF A MIST ELIMINATOR IN A WIND TURBINE ROTOR

(71) Applicant: Wobben Properties GmbH, Aurich (DE)

(72) Inventor: Julius Schriever-Schubring, Aurich (DE)

(73) Assignee: Wobben Properties GmbH, Aurich (DE)

(*) Notice: Subject to any disclaimer, the term of this patent is extended or adjusted under 35 U.S.C. 154(b) by 109 days.

(21) Appl. No.: 16/475,629

(22) PCT Filed: Jan. 3, 2018

(86) PCT No.: PCT/EP2018/050092
§ 371 (c)(1),
(2) Date: Jul. 2, 2019

(87) PCT Pub. No.: WO2018/127500
PCT Pub. Date: Jul. 12, 2018

(65) Prior Publication Data
US 2019/0323487 A1   Oct. 24, 2019

(30) Foreign Application Priority Data
Jan. 5, 2017 (DE) ............... 10 2017 100 134.4

(51) Int. Cl.
*F03D 1/06* (2006.01)
*F03D 80/60* (2016.01)
*F03D 9/25* (2016.01)

(52) U.S. Cl.
CPC ............... *F03D 80/60* (2016.05); *F03D 1/06* (2013.01); *F03D 1/0691* (2013.01); *F03D 9/25* (2016.05)

(58) Field of Classification Search
CPC ..... F03D 1/0691; F03D 80/60; F05B 2260/64
See application file for complete search history.

(56) References Cited

U.S. PATENT DOCUMENTS

| 8,476,784 B2 * | 7/2013 | Sato ...................... F03D 1/0675 290/55 |
| 8,727,842 B2 | 5/2014 | Pfannenberg |
| 9,567,048 B2 | 2/2017 | Rohden |
| 9,624,908 B2 * | 4/2017 | Airoldi ................... F03D 15/20 |

(Continued)

FOREIGN PATENT DOCUMENTS

| CN | 101122299 A | 2/2008 |
| CN | 201273249 Y | 7/2009 |

(Continued)

*Primary Examiner* — Ninh H. Nguyen
(74) *Attorney, Agent, or Firm* — Seed Intellectual Property Law Group LLP (57) ABSTRACT

A wind turbine comprising a pod and an aerodynamic rotor having a rotor head or a spinner. The rotor head or spinner is arranged in that case in the afflux flow direction of the wind in front of the rotor blade plane. Provided in or at the rotor head or the spinner of the rotor is a mist eliminator which rotates with the rotor head or spinner. The mist eliminator has an end which is in the form of an opening in the rotor head or the spinner. Air can enter through that end and flow through the mist eliminator in such a way that substantially water droplet-free air is present at the outlet of the mist eliminator, and can be used for cooling the generator.

6 Claims, 15 Drawing Sheets (56) References Cited

U.S. PATENT DOCUMENTS

| | | | |
|---|---|---|---|
| 9,657,719 B2 * | 5/2017 | Chacon | ............... F03D 80/00 |
| 9,689,263 B2 | 6/2017 | Gharaibah et al. | |
| 2011/0175368 A1 | 7/2011 | Sato et al. | |
| 2015/0010402 A1 | 1/2015 | Rohden | |

FOREIGN PATENT DOCUMENTS

| | | |
|---|---|---|
| CN | 101769236 A | 7/2010 |
| CN | 201714602 U | 1/2011 |
| CN | 102149919 A | 8/2011 |
| CN | 202023704 U | 11/2011 |
| CN | 202622678 U | 12/2012 |
| CN | 202740964 U | 2/2013 |
| CN | 103118936 A | 5/2013 |
| CN | 203962298 U | 11/2014 |
| CN | 204828030 U | 12/2015 |
| CN | 205351498 U | 6/2016 |
| CN | 105736258 A | 7/2016 |
| CN | 105756993 A | 7/2016 |
| CN | 205828901 U | 12/2016 |
| DE | 102007045044 A1 | 3/2009 |
| DE | 102012212619 A1 | 1/2014 |
| GB | 265679 A | 2/1927 |
| RU | 2522015 C2 | 7/2014 |
| RU | 2014133165 A | 3/2016 |
| WO | WO-2019076414 A1 * | 4/2019 ........... F03D 1/0691 |

\* cited by examiner

WIND TURBINE AND USE OF A MIST ELIMINATOR IN A WIND TURBINE ROTOR

BACKGROUND

Technical Field

The present invention concerns a wind turbine and a use of a mist eliminator in a wind turbine rotor.

Description of the Related Art

A wind turbine typically has a pod having an aerodynamic rotor which typically has three rotor blades. An electric generator is directly or indirectly coupled to the aerodynamic rotor and generates electric energy when the aerodynamic rotor rotates. In operation the electric generator produces waste heat so that the generator has to be cooled. In addition, provided in the pod are further electrical components like for example a rectifier which also generates waste heat and should therefore be cooled.

Cooling within the pod can be implemented for example by a closed cooling system or by a cooling system which draws in outside air through an opening into the stationary part of the pod. That drawn-in air can then be used for cooling the electric generator and the further electrical components and thereafter can be blown outwardly again. In that case the drawn-in outside air can also involve moist air, up to water drops from fog or rain.

On the German patent application from which priority is claimed the German Patent and Trade Mark Office searched the following documents: DE 10 2007 045 044 A1 and DE 10 2012 212 619 A1.

BRIEF SUMMARY

Provided is a wind turbine having more effective cooling, in particular to provide a cooling system of a wind turbine with water droplet-free outside air and to discharge in defined fashion the water which has been removed.

Provided is a wind turbine comprising a pod and an aerodynamic (rotatable) rotor having a rotor head or a spinner. The rotor head or spinner is arranged in that case in the afflux flow direction of the wind in front of the rotor blade plane. Provided in or at the rotor head or the spinner of the rotor is a mist eliminator which rotates with the rotor head or spinner. The mist eliminator has an end which is in the form of an opening in the rotor head or the spinner. Air can enter through that end and flow through the mist eliminator in such a way that substantially water droplet-free air is present at the outlet of the mist eliminator, and can be used for cooling the generator. The mist eliminator is disposed in the rotating part of the pod, namely in the rotor. Accordingly the mist eliminator rotates together with the rotor.

By way of example the droplets which can be minimally separated with that mist eliminator can be 15 μm in diameter. Smaller droplets can only be separated by involving a higher level of cost and effort and higher pressure losses.

According to an aspect of the present invention, the mist eliminator is in the form of at least one slat or plate arranged in a spiral configuration. The spiral can be of a conical configuration. One end of the spiral (that is to say the tip) represents an opening in the rotor head so that moist outside air passes to the tip of the spiral and the moist air flows through the spiral-shaped mist eliminator so that the air is separated from the moisture contained therein.

The configuration of the mist eliminator in the form of a spiral-shaped slat, wherein a base line of the spiral represents a cone, is particularly advantageous because in that way the separated liquid is conveyed to the center of the spiral due to the inherent rotation of the mist eliminator and can then drain away.

In an aspect of the present invention, the conical shape of the spiral is only of a very shallow implementation in order to avoid the gap between two slat layers becoming too small (as far as making contact) on the side that is towards the wind, and becoming too great on the inner side that is away from the wind.

According to an aspect of the present invention, the gradient of the spiral is steeper in the innermost region of the mist eliminator in order to transport separated liquid within a small radius to the tip of the mist eliminator.

No further droplet separation takes place in the inner region as great deflection of the afflux flow of air is no longer caused here. The separated water runs in the channel of the mist eliminator due to the great deflection which occurs in the slats forwardly to the first end of the mist eliminator and can flow away outwardly. Therefore optionally a barrier for example in the form of a wall can be provided in the rear inner part of the mist eliminator.

With the wind turbine according to the invention it is possible to provide water droplet-free air for air cooling of the wind turbine, which is produced by a rotating mist eliminator in the rotor head or the spinner.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
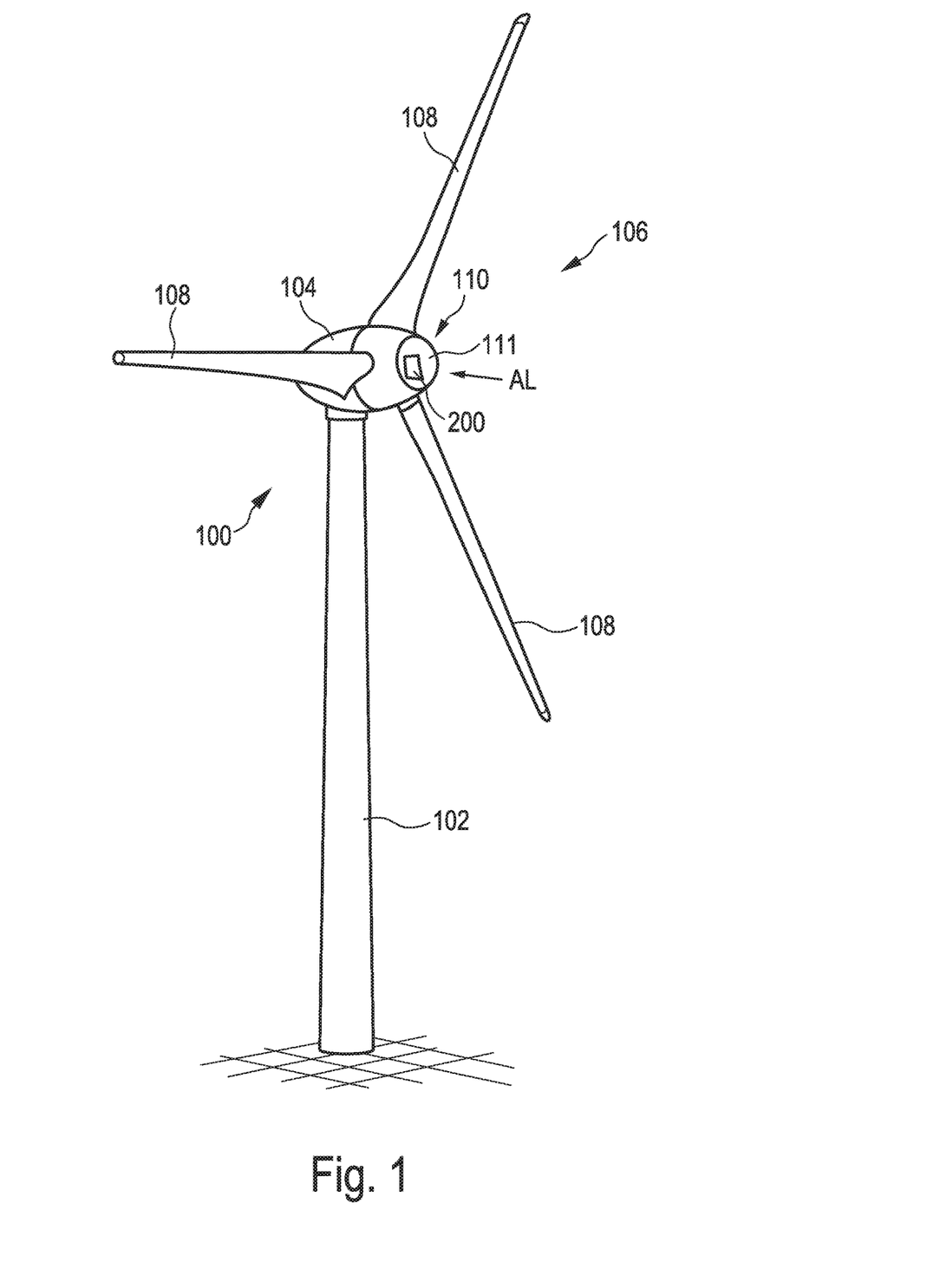
FIG. 1 shows a diagrammatic view of a wind turbine according to a first embodiment.

FIG. 1 shows a diagrammatic view of a wind turbine according to a first embodiment. The wind turbine 100 has a tower 102 and a pod 104. A rotor 106 having three rotor blades 108 and a spinner or rotor head 110 is provided on the pod 104. The rotor 106 is driven in rotation in operation by the wind and drives a generator in the pod to generate electric energy. Furthermore in the region of the rotor head or the spinner 110 the wind turbine has a mist eliminator 200. The mist eliminator 200 is coupled to the rotor head or the spinner 110 so that the mist eliminator 200 rotates together with the rotor head 110. Provided in the rotor head or the spinner 110 is an end of the mist eliminator 200, in the form of an opening 111 through which outside air AL can pass into the interior of the rotor head 110 and thus into the rest of the mist eliminator 200. The water droplets contained in the outside air AL are removed therefrom by the mist eliminator 200 so that substantially water droplet-free air L is present at the outlet of the mist eliminator.

Figure 2A:
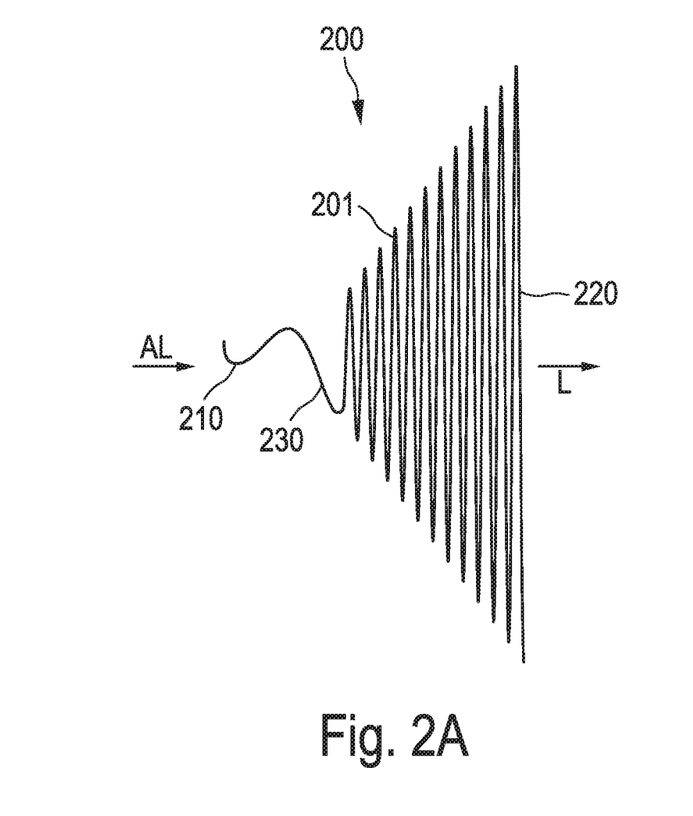
FIGS. 2A and 2B show diagrammatic views of a mist eliminator according to a first embodiment.
Figure 2B:
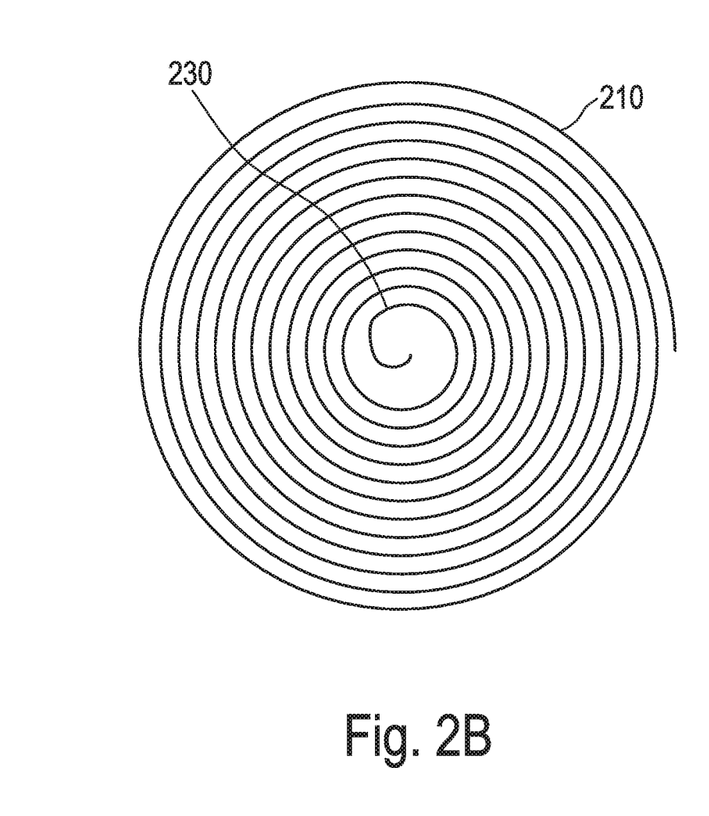

FIGS. 2A and 2B show diagrammatic views of a mist eliminator according to a first embodiment. According to the first embodiment the mist eliminator 200 has at least one plate or slat 201 arranged in a spiral shape. The spiral 200 forms a cone so that a tip 210 of the spiral 200 is arranged upstream. Accordingly the tip 210 forms a first end of the spiral. The second end 220 of the spiral is provided at the opposite side of the spiral 200. At the first end 210 moist and water droplet-bearing outside air AL passes into the spiral-shaped mist eliminator and substantially water droplet-free air L is discharged at the second end 220.

The configuration of the spiral-shaped mist eliminator, with the slat arranged in a spiral shape, which has a conical base line of the spiral, provides that the separated liquid is conveyed by the rotation of the mist eliminator towards the center of the spiral and can there run away.

The conical shape is only very slight in order to avoid the gap between the slat layers on the side towards the wind becoming too small (to the degree of making contact) and becoming too large on the inner side remote from the wind. The gradient of the spiral is steeper in the inner region 230 of the mist eliminator 200 than in the outer region. That is advantageous so that the separated liquid or fluid can be transported within a small radius to the tip 210 so that the separated liquid can be discharged outwardly. By virtue of the configuration of the inner region 230 that now only limitedly contributes to droplet separation, in particular because there is no severe deflection of the flow in that inner region. The water which enters here is displaced by the following separated liquid which is drawn out here by the rotation and is pushed outwardly.

Optionally a wall or barrier can be provided in the region of the inner region of the second end 220. The wall should be involved in the inner region of 220 because otherwise water droplet-bearing air flows into the rotor head. None may be involved in the outer region of the 220 because otherwise the air can no longer flow away.

Figure 3:
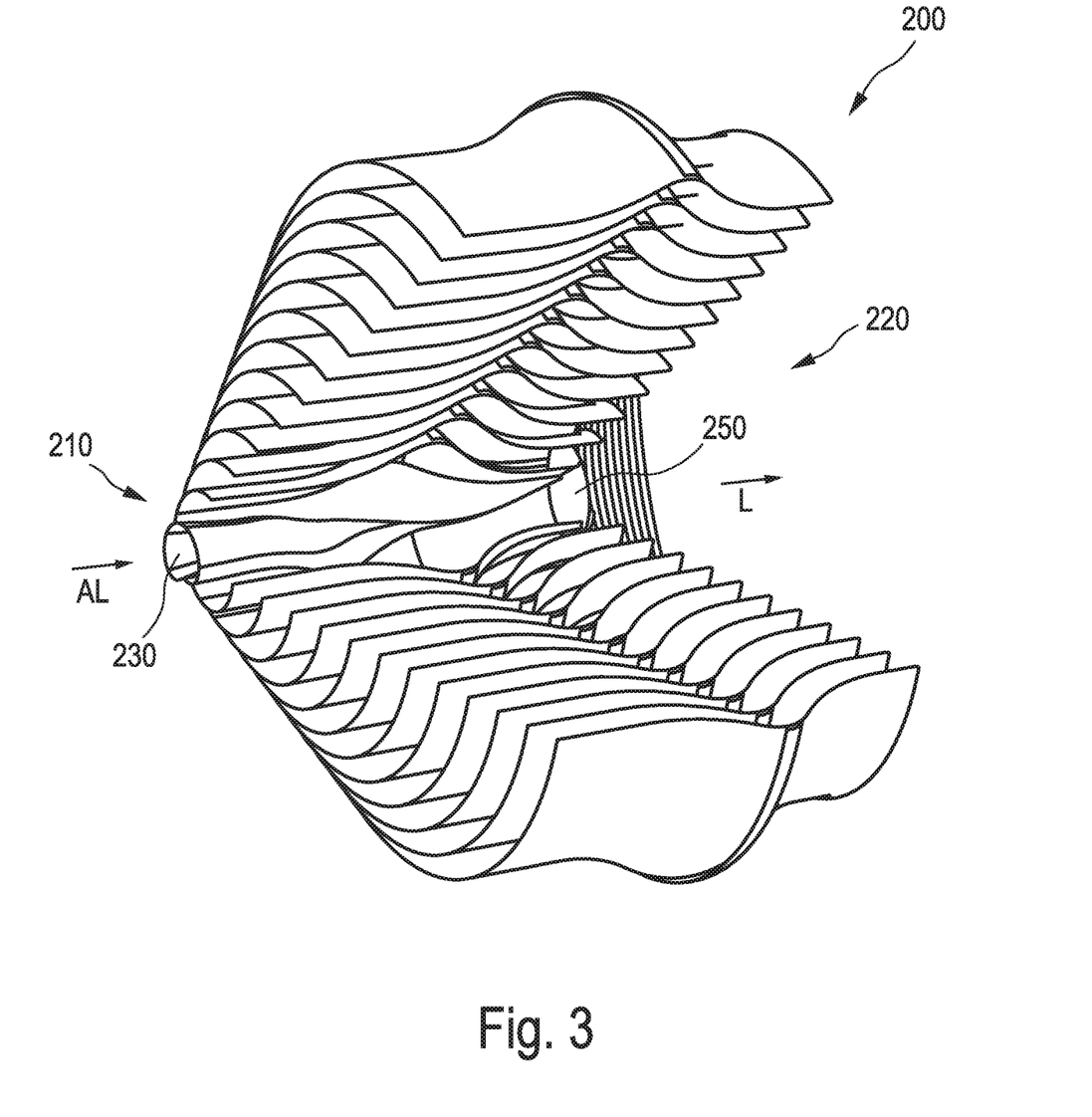
FIG. 3 shows a perspective sectional view of a mist eliminator according to a second embodiment.

FIG. 3 shows a perspective sectional view of a mist eliminator according to a second embodiment. FIG. 3 shows in particular a section through the three-dimensional configuration of the mist eliminator according to the second embodiment. The mist eliminator 200 has a first end 210 and a second end 220. The mist eliminator is arranged in particular in the form of a slat of a spiral-shaped configuration, having a conical base line. Optionally a wall 250 can be provided as a barrier for water droplet-bearing air in an inner region 230 and at the second end 220 in order to prevent the water droplet-bearing air from passing into the rotor head.

The pressure loss occurring due to the mist eliminator 200 is caused by the shape of the slats and half of the gap between the respective layers of the spiral. In order to achieve water droplets which can be separated of about 10 μm to 5 mm a spacing of about 10 mm to 100 mm is provided between the slat layers.

Figure 4:
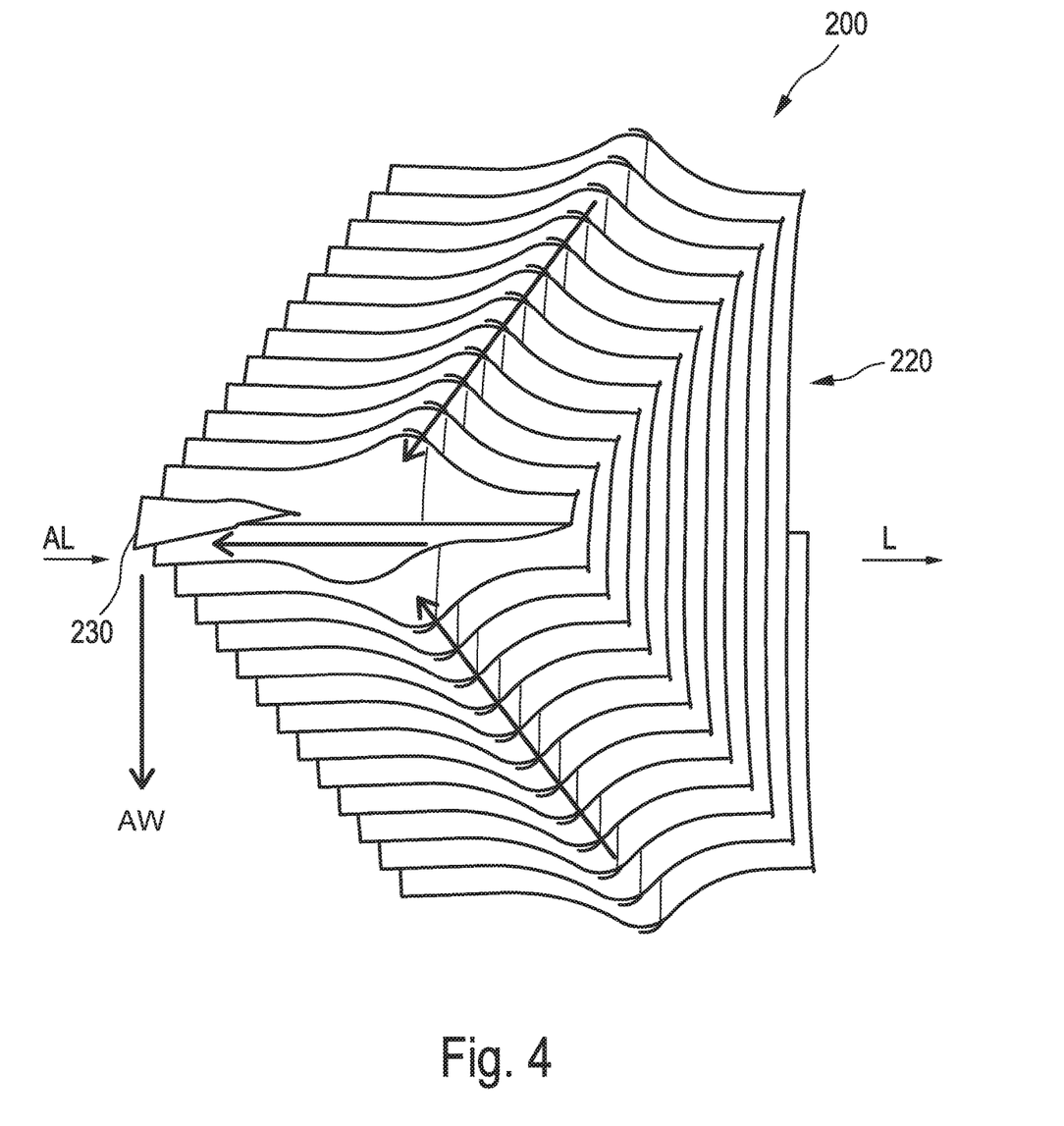
FIG. 4 shows a perspective sectional view of a mist eliminator according to a third embodiment.

FIG. 4 shows a perspective sectional view of a mist eliminator according to a third embodiment. The mist eliminator according to the third embodiment has a slat arranged in a spiral shape, which has a conical base line. The mist eliminator 200 has a first end 210 and a second end 220 as well as an inner region 230. Water droplet-bearing outside air AL is introduced into the first end and water droplet-free air L is discharged at the second end 220. The separated water AW passes into the inner region 230 due to the rotational movement of the mist eliminator and then towards the first end 210 where it can flow away outwardly.

The mist eliminator operates on the basis of the principle of flow deflection by virtue of shaped passages involving slats. Separated water is transported by the rotational movement forwardly to the first end 210 of the eliminator, where it can then flow away outwardly.

According to an aspect of the present invention an overflow forwardly can be so designed that water cannot pass into the turbine when the turbine is stationary. In particular the level of each slat layer can be radially closer to the axis of rotation in the front region of the mist eliminator than in the rear region thereof.

Figure 5:
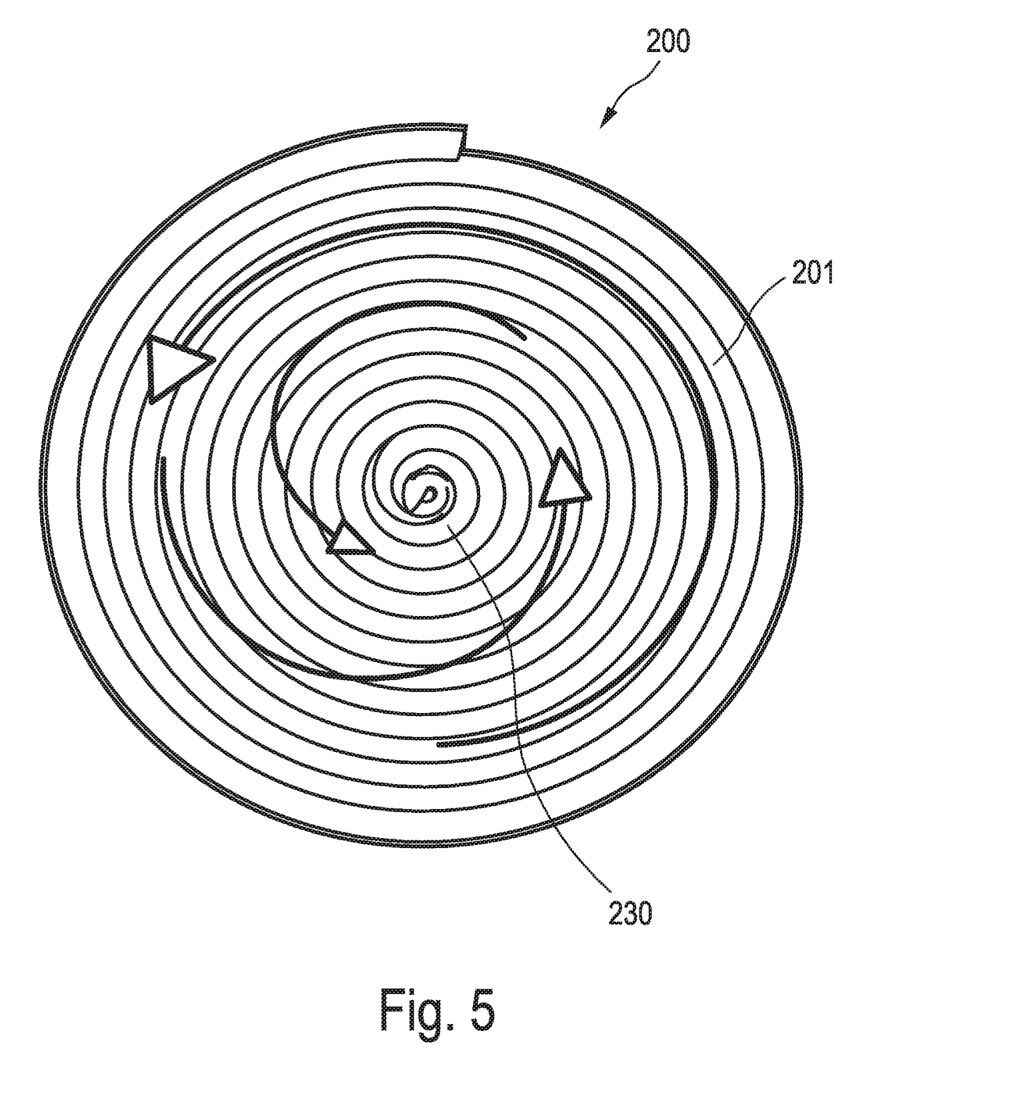
FIG. 5 shows a plan view of the mist eliminator as shown in FIG. 4, FIGS. 6A to 6C respectively show a diagrammatic view of a mist eliminator according to a fourth embodiment, FIGS. 6D and 6E each show a diagrammatic view of a water flow path in the mist eliminator according to the fourth embodiment, FIGS. 7A to 7C each show a diagrammatic view of a mist eliminator according to a fifth embodiment.

FIG. 5 shows a plan view of the mist eliminator shown in FIG. 4. In this case the arrows in FIG. 5 show how the separated water is conveyed towards the first end 210.

In the wind turbine, the dynamic pressure arising out of the afflux flow of the wind can be utilized for at least partially overcoming the pressure losses of the mist eliminator.

The mist eliminator has slats which produce severe changes in direction in the flow passage of the eliminator and can thus cause separation of gaseous and liquid phases.

Moisture droplets can be separated for example with a slat spacing of 20 mm up to a size of 15 μm.

Figure 6A:
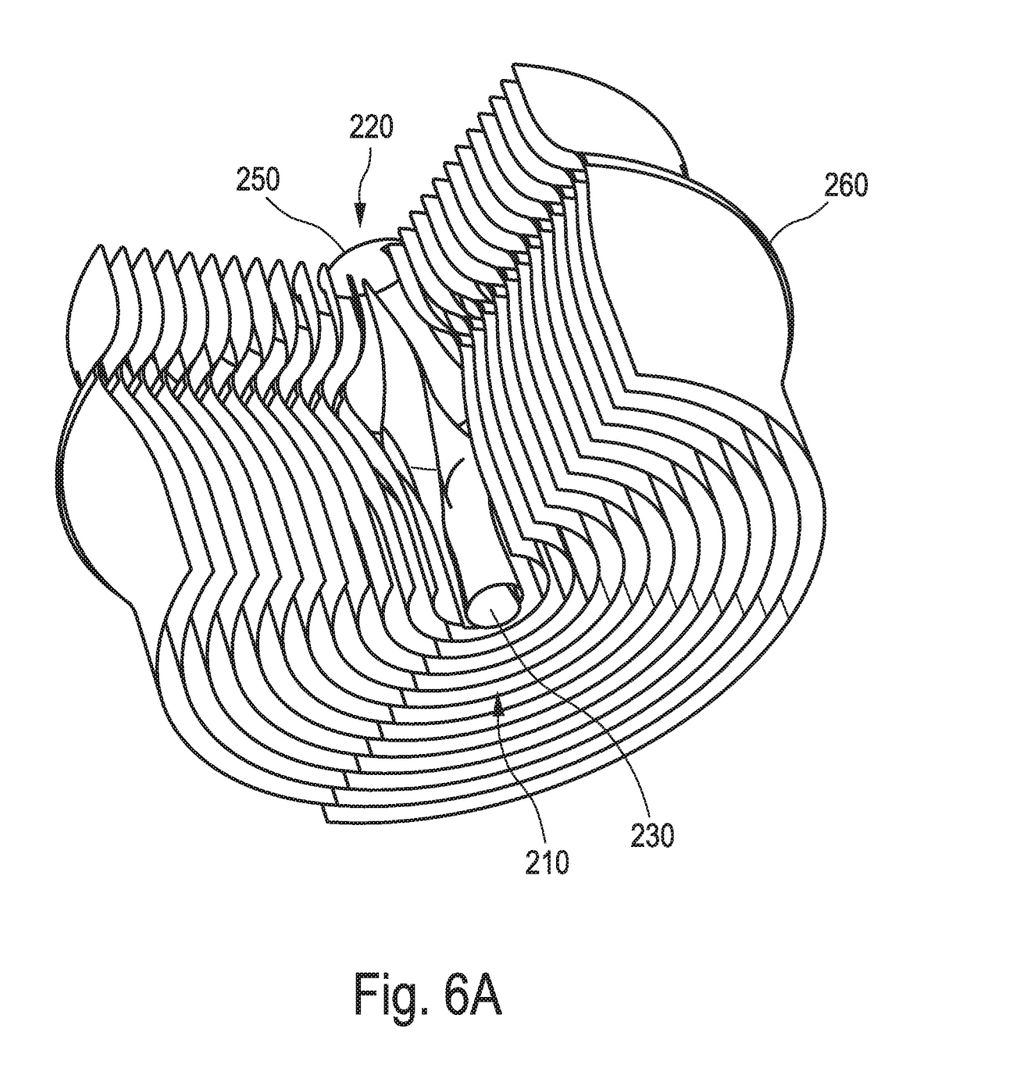
Figure 6B:
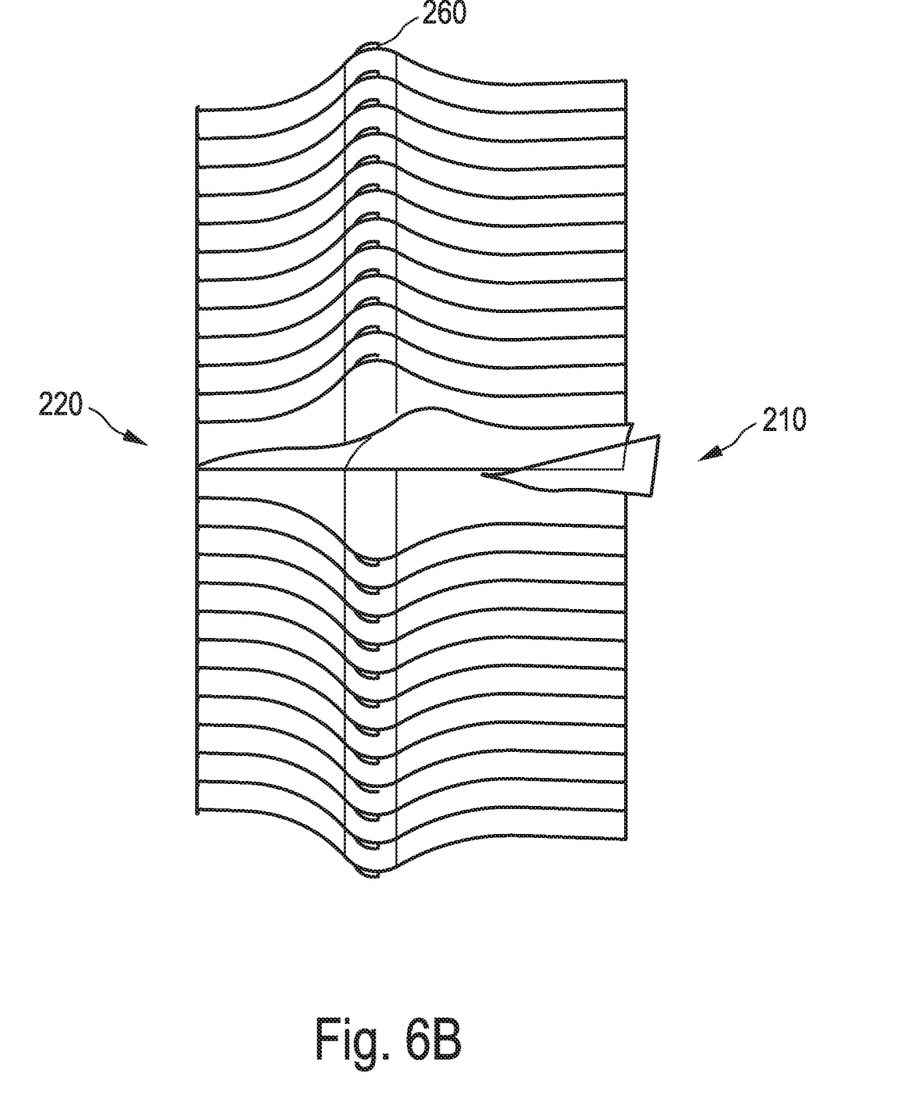
Figure 6C:
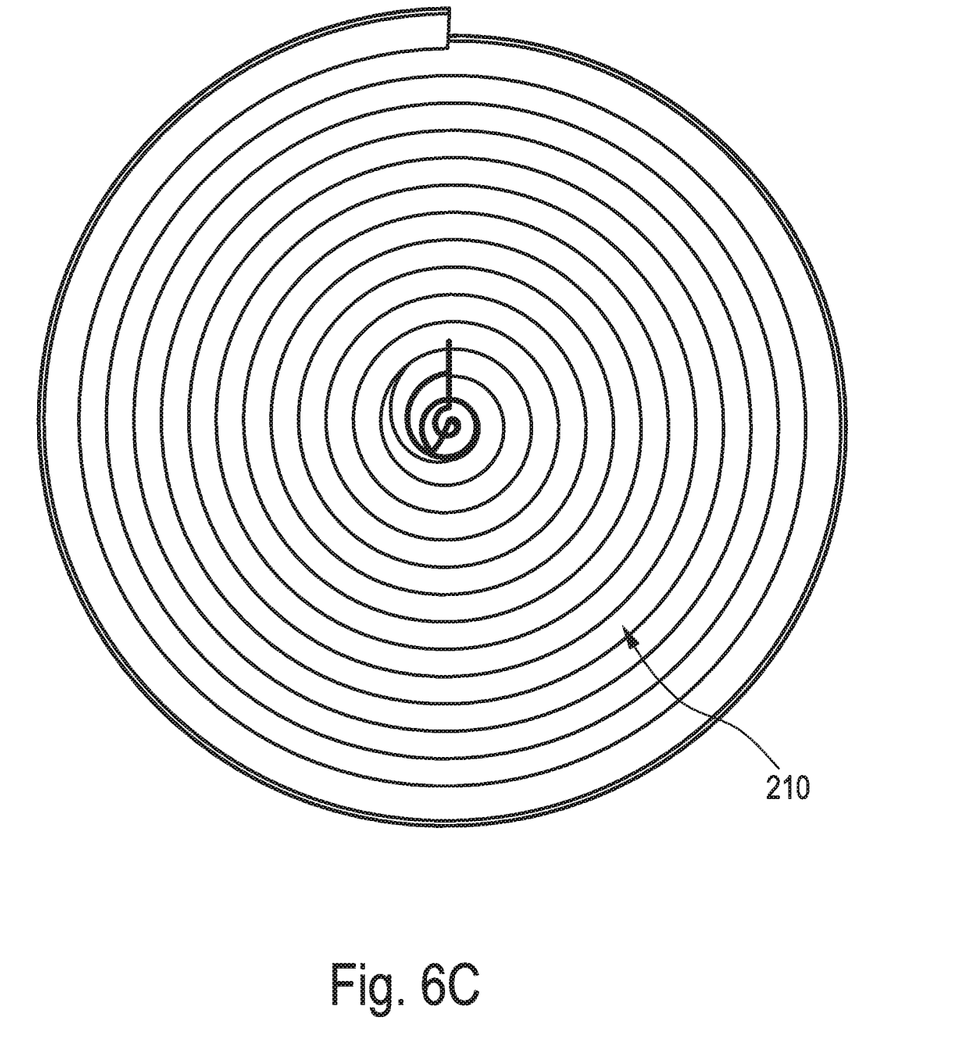

FIGS. 6A to 6C each show a diagrammatic view of a mist eliminator according to a fourth embodiment. The mist eliminator of the fourth embodiment substantially corresponds to that according to the third embodiment, but the spiral here is not of a conical configuration. In the mist eliminator according to the fourth embodiment the water flows away forwardly, that is to say to the first end 210 of the mist eliminator. According to the invention there can be provided a channel 260 by way of which or by means of which the water can flow away. The basic shape of the mist eliminator is not of a conical configuration. The first and second ends in this case can be straight.

FIG. 6 shows the front view of the mist eliminator according to the fourth embodiment. In particular the spiral shape of the mist eliminator can be seen here.

Figure 6D:
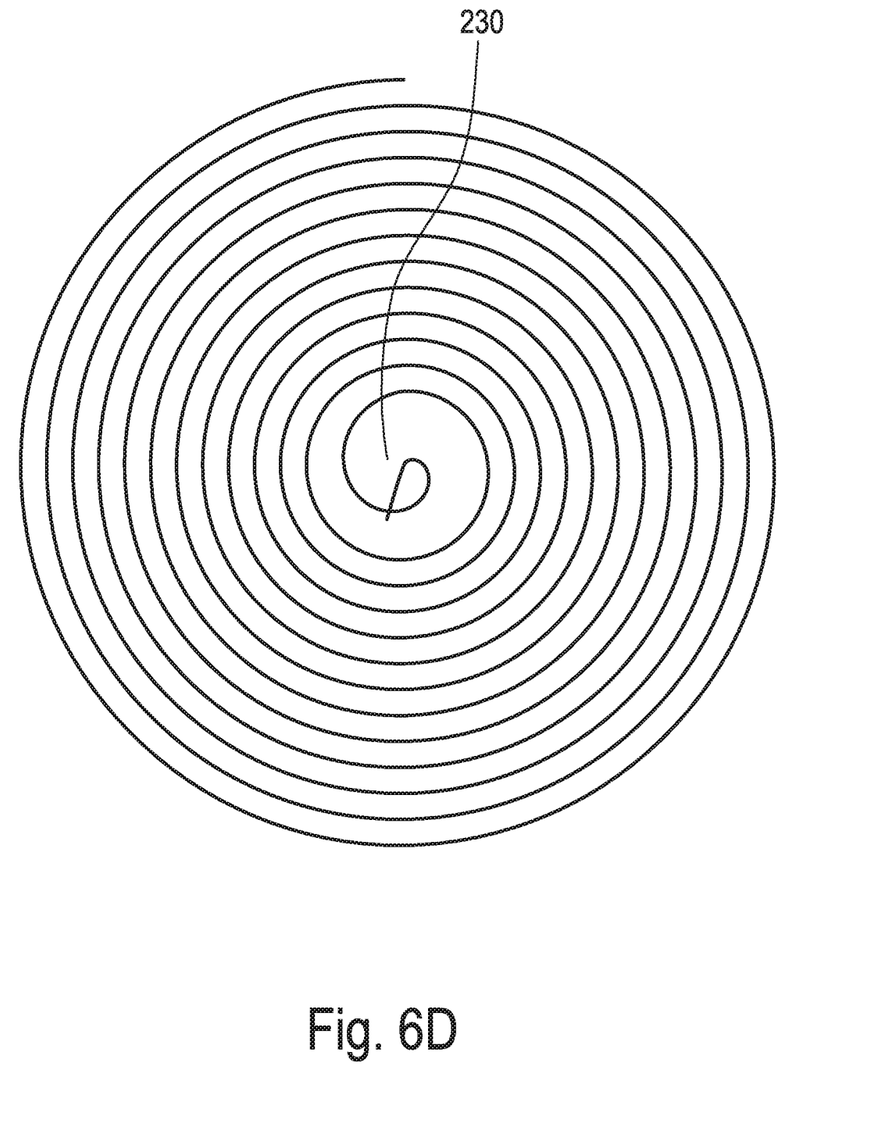
Figure 6E:
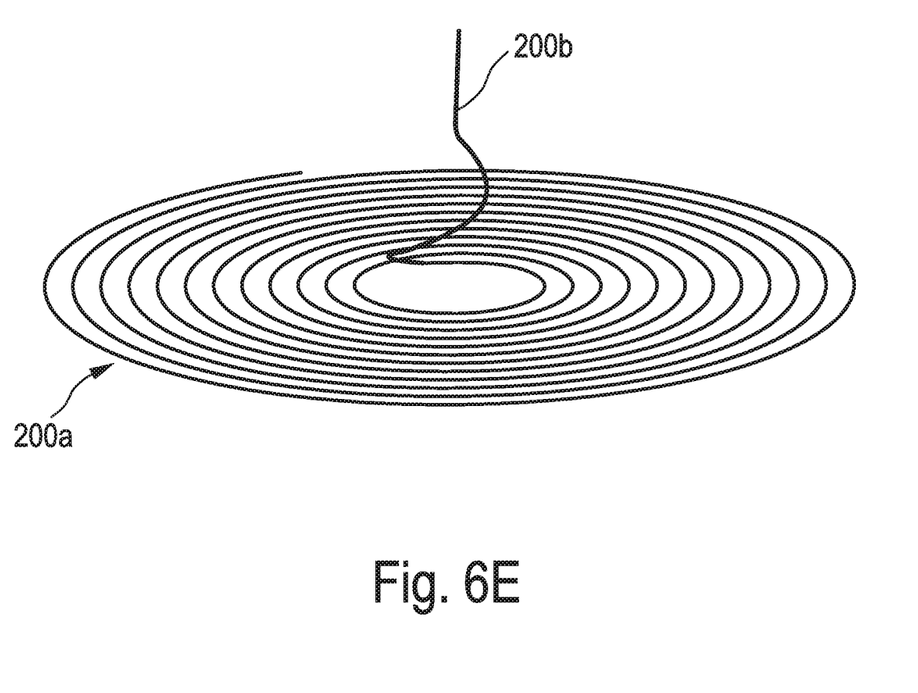

FIGS. 6D and 6E each show a diagrammatic view of the water flow in the mist eliminator according to the fourth embodiment. In contrast to the mist eliminator of the third embodiment the water flow path represents a plane. The water flows out in particular forwardly and in the center. As can be seen from FIG. 6E the water discharge is provided substantially in a plane 200a, wherein a portion 200b projects out of the plane, wherein that portion 200b makes it possible for the water to be able to flow away forwardly.

Figure 7A:
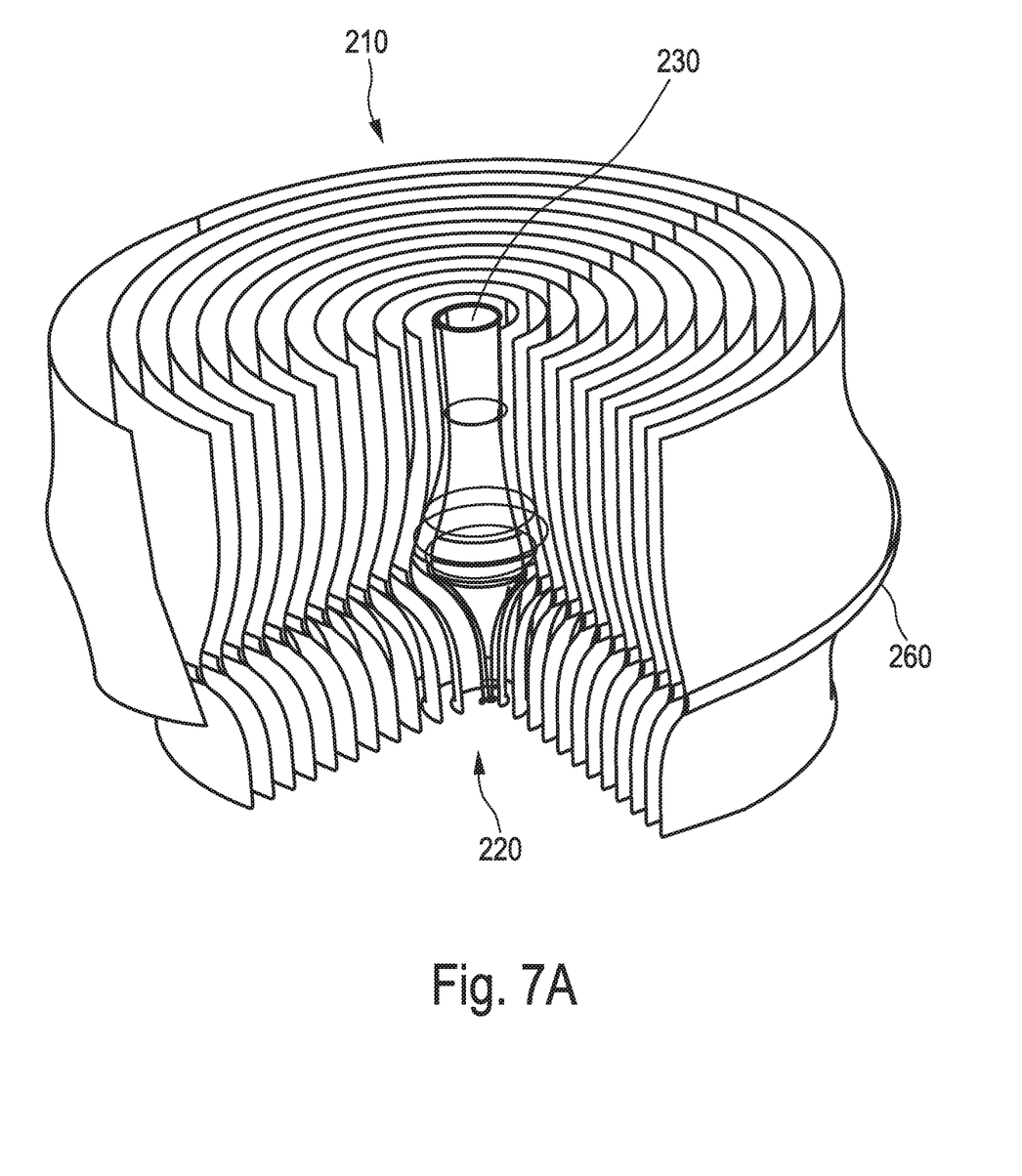
Figure 7B:
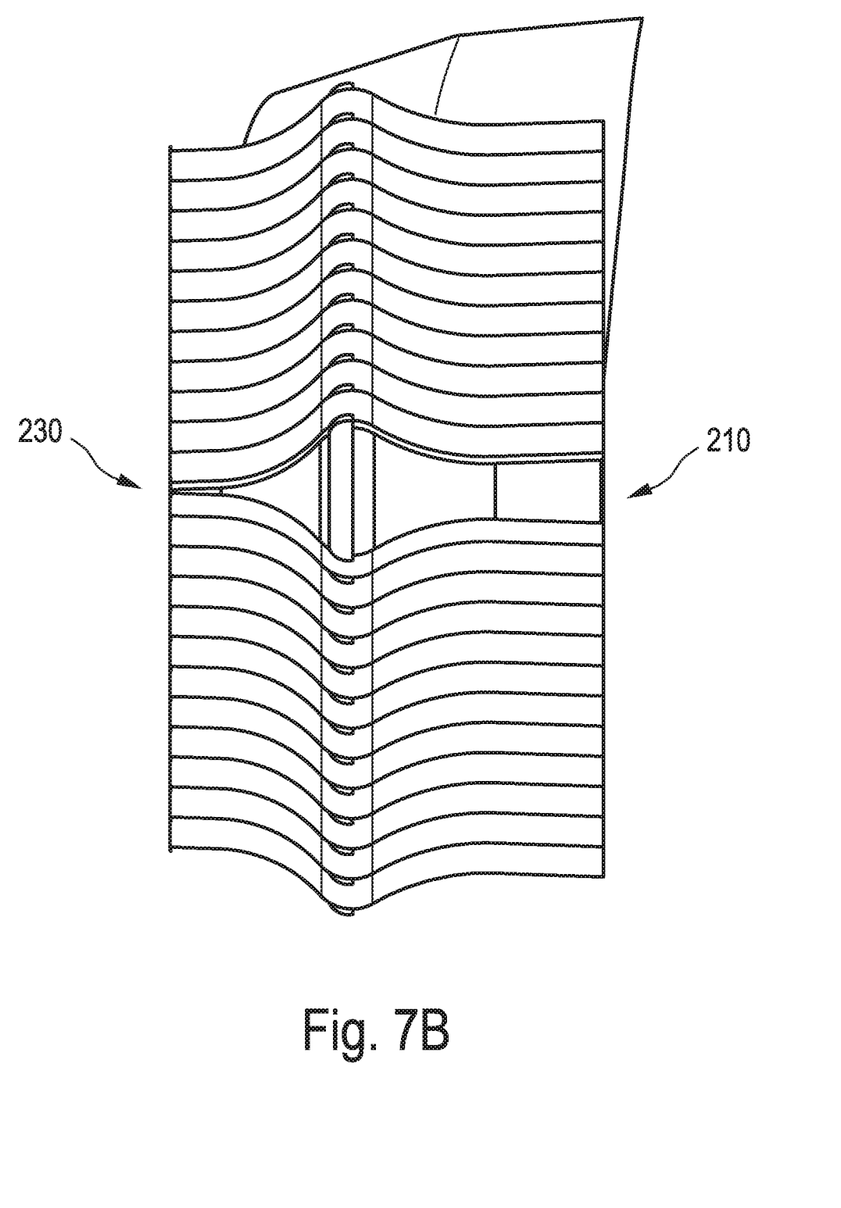
Figure 7C:
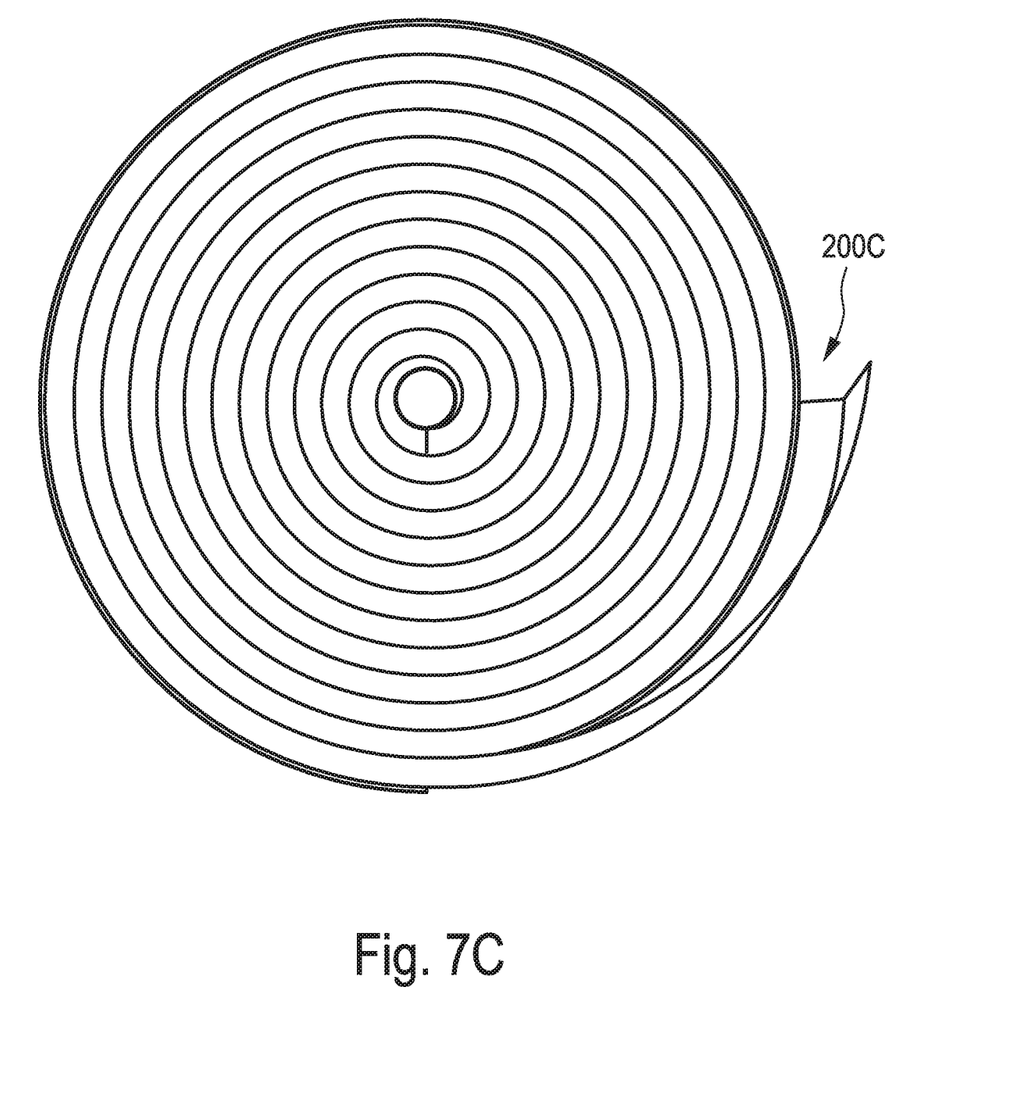

FIGS. 7A to 7C each show a diagrammatic view of a mist eliminator according to a fifth embodiment. In the case of the mist eliminator according to the fifth embodiment, there is provided a mist eliminator which does not have a conical base surface, that is to say the front and rear ends 210, 220 are respectively straight. The mist eliminator can also have a channel 260.

In an aspect of the present invention the water can flow away outwardly and forwardly by way of the discharge drain 230. According to the fourth embodiment the central portion can be narrowed rearwardly.

In accordance with the fifth embodiment the water does not flow away in the center but in the outer portion 200c.

Figure 7D:
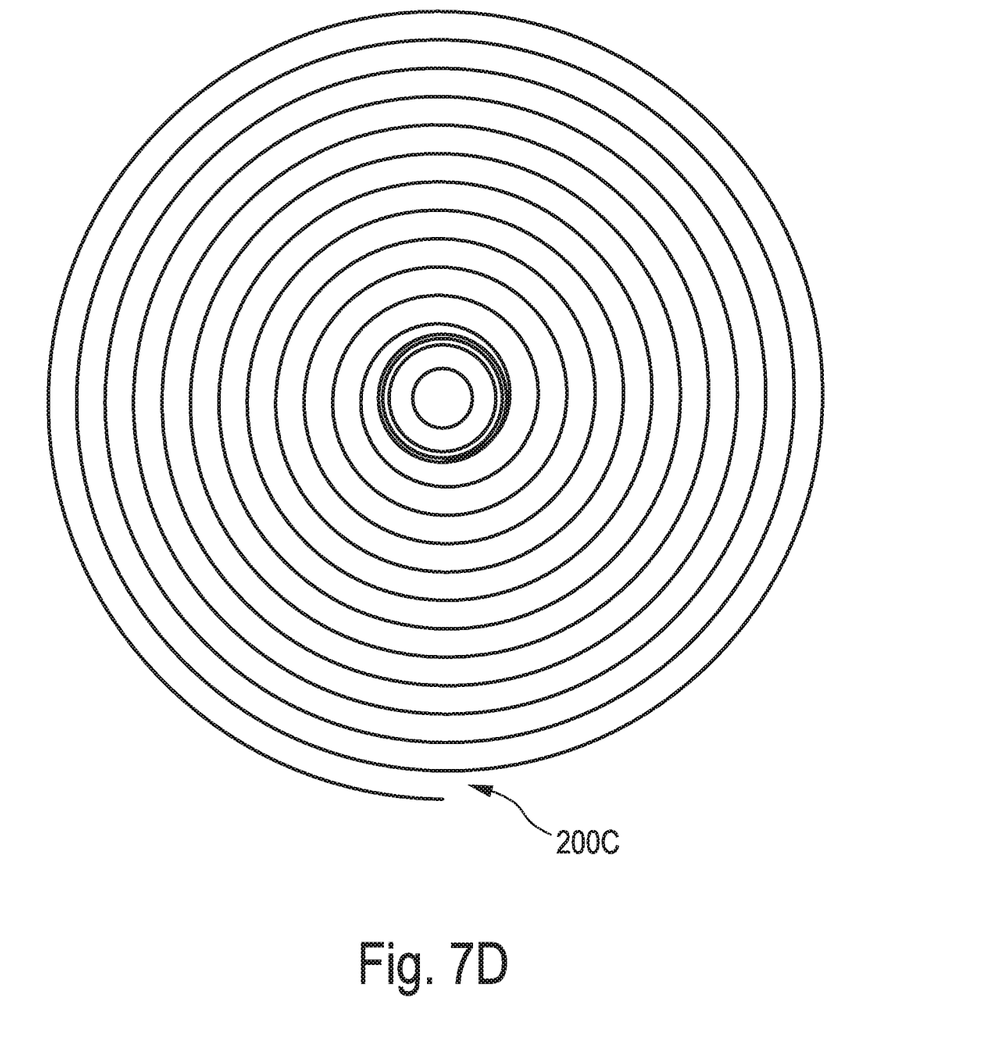
FIG. 7D shows a diagrammatic view of a water flow path in the mist eliminator according to the fifth embodiment.

FIG. 7D shows the water discharge. In particular the water flows away at the portion 200c, that is to say at the outer region. Accordingly the water flows away and drains to the side.

Figure 8:
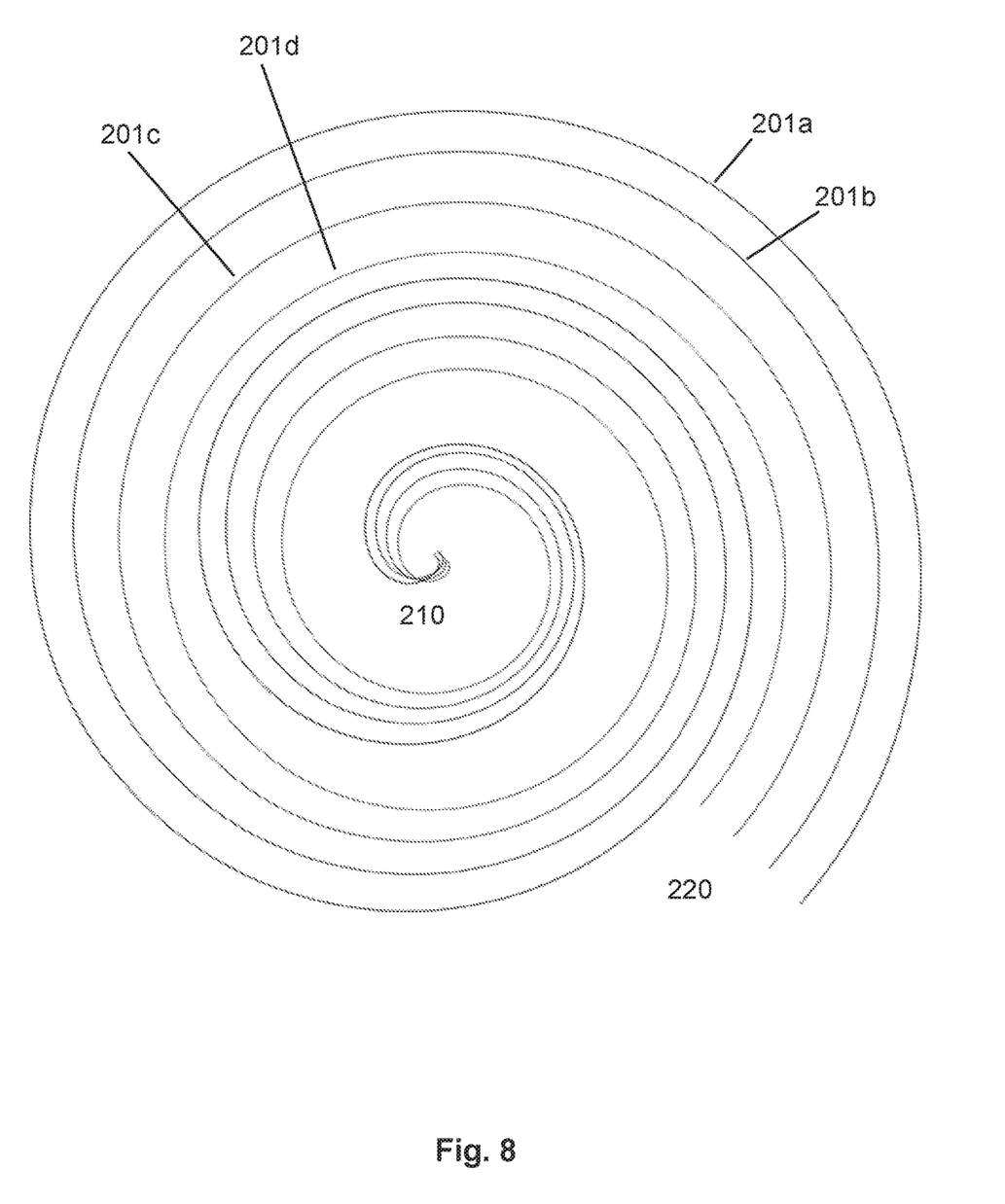
FIG. 8 shows a diagrammatic view of a water flow path in the mist eliminator according to the sixth embodiment.

FIG. 8 shows a diagrammatic view of a water flow path in a mist eliminator according to a sixth embodiment. The mist eliminator according to the sixth embodiment can be based on a mist eliminator according to the first, second, third, fourth or fifth embodiment. In particular the mist eliminator has a plurality of slats 201a, 201b, 201c, 201d which can be arranged in mutually parallel relationship. Those slats can be in the form of profile members which extend in mutually parallel relationship. In that way the separated droplets can flow away parallel so that the flow of the separated droplets are not added together to give a large amount of liquid until the end of the spiral.

The invention claimed is:

1. A wind turbine, comprising:
   a rotor having three rotor blades and a rotor head; and
   a mist eliminator in a region of the rotor head, the mist eliminator being configured to allow outside air to flow into an interior of the rotor head,
   wherein the mist eliminator has a first end and a second end,
   wherein the first end of the mist eliminator forms an opening of the rotor head, and
   wherein the mist eliminator has at least one slat of a spiral-shaped configuration.

2. The wind turbine according to claim 1 wherein the spiral-shaped configuration of the mist eliminator is of a conical configuration.

3. The wind turbine according to claim 1 wherein the mist eliminator has a spiral tip at the first end or the second end.

4. The wind turbine according to claim 3 wherein the mist eliminator has an inner region at the first end, wherein the inner region at the first end has a greater gradient than a remaining portion of the at least one slat to transport separated liquid to the spiral tip at the first end.

5. The wind turbine according to claim 1, further comprising:
   a wall in an inner region of the second end.

6. A method comprising rotating the rotor head of claim 1 to allow the outside air to flow through the mist eliminator and into the interior of the rotor head, wherein the mist eliminator removes water from the outside air before providing the outside air to the interior of the rotor head.

* * * * *